United States Patent [19]
Carapelli

[11] Patent Number: 6,031,222
[45] Date of Patent: Feb. 29, 2000

[54] OPTICAL ROTARY ENCODER HAVING TWO HALF-PARTS OF A LATERAL SURFACE OF A ROTATING DISK

[75] Inventor: Giovanni Carapelli, Florence, Italy

[73] Assignee: Logitron S.r.l., Florence, Italy

[21] Appl. No.: 08/971,659

[22] Filed: Nov. 17, 1997

[30] Foreign Application Priority Data

Apr. 17, 1997 [IT] Italy .................................. FI97A0081

[51] Int. Cl.⁷ ...................................................... G01D 5/34
[52] U.S. Cl. .................................. 250/231.13; 250/231.16
[58] Field of Search ....................... 250/231.13, 231.14, 250/237 G, 231.16, 214 PR; 356/375; 341/3, 13

[56] References Cited

U.S. PATENT DOCUMENTS

| | | | |
|---|---|---|---|
| 4,650,995 | 3/1987 | Tokunaga et al. ................. | 250/231.13 |
| 4,806,751 | 2/1989 | Abe et al. ........................... | 250/231.13 |
| 5,038,031 | 8/1991 | Kurosawa et al. ................. | 250/231.14 |
| 5,045,691 | 9/1991 | Steward et al. .................... | 250/231.16 |
| 5,073,001 | 12/1991 | Sato et al. .................................. | 385/19 |

FOREIGN PATENT DOCUMENTS

| | | |
|---|---|---|
| 13438939 | 5/1986 | Germany . |
| 13841275 | 6/1990 | Germany . |
| 13942857 | 5/1991 | Germany . |

*Primary Examiner*—Que T. Le
*Attorney, Agent, or Firm*—Abelman, Frayne & Schwab

[57] ABSTRACT

Optical encoder and pulser with remote powered components and constituted by a rotating disk having one or more light reflecting portions which are illuminated by at least one illuminating optical fiber, the light pulses caused by said reflecting portions being reflected towards at least one receiving optical fiber.

6 Claims, 2 Drawing Sheets

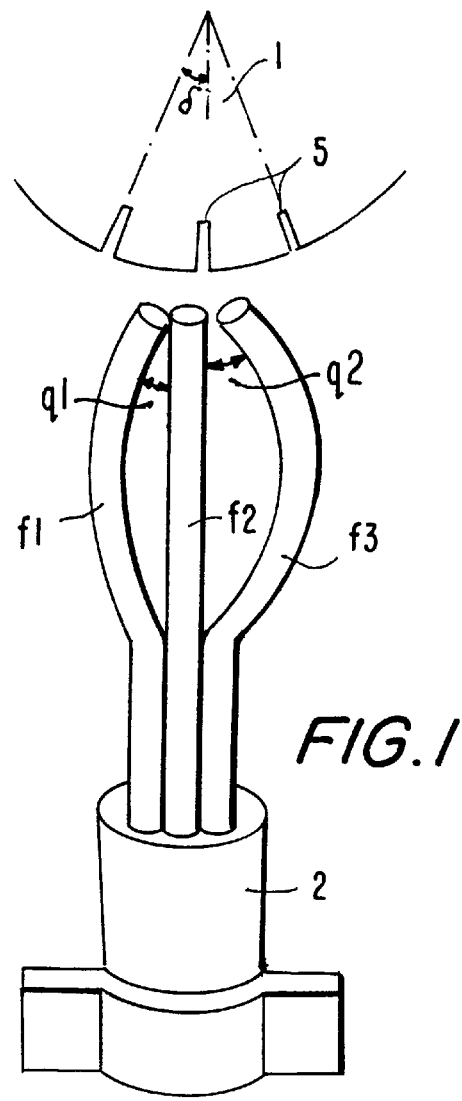
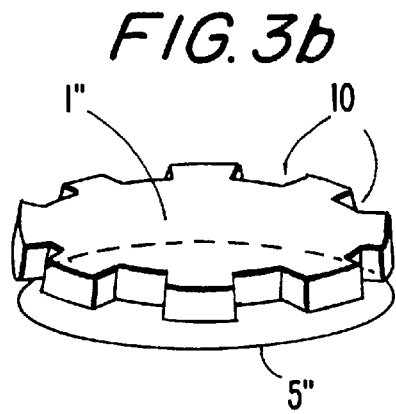
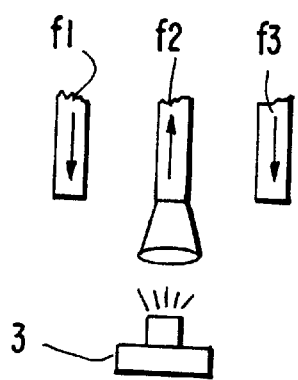
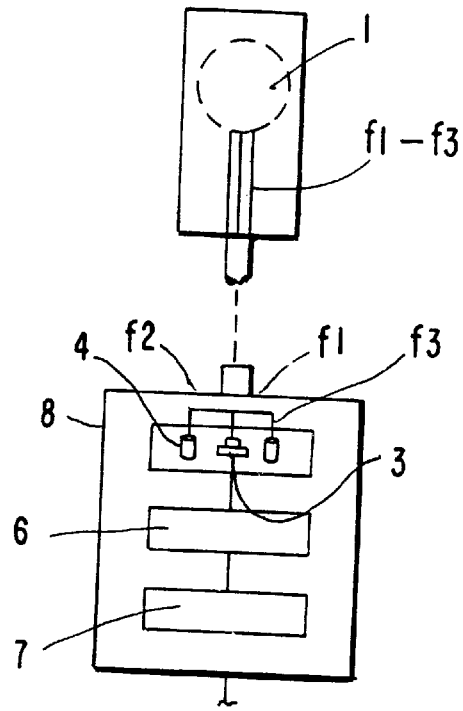
FIG. 1
FIG. 3b
FIG. 2
FIG. 4

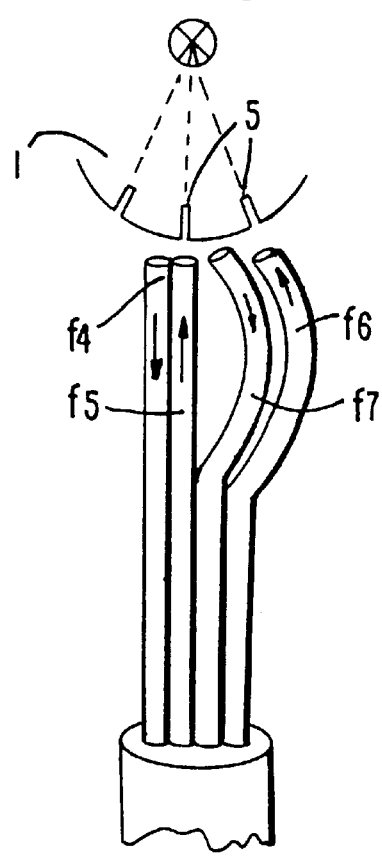
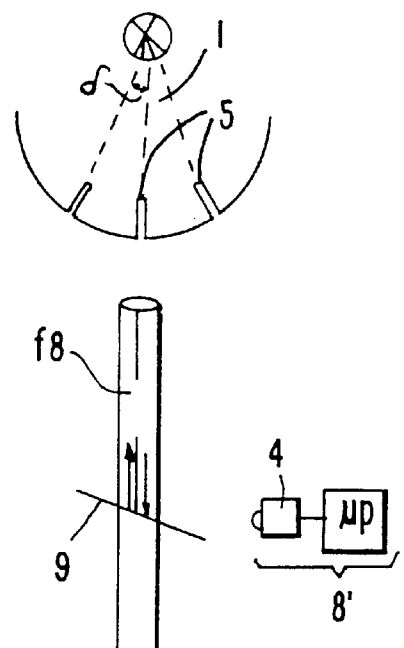
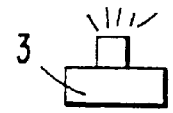
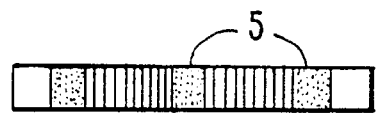
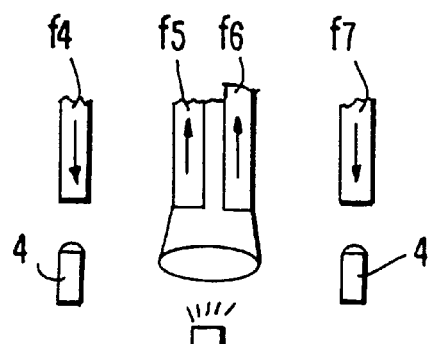
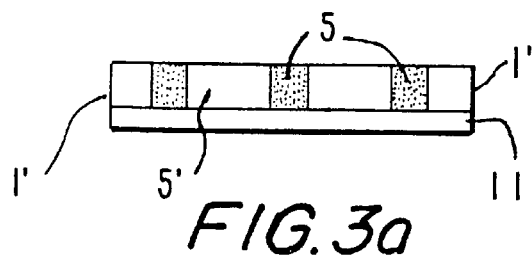

OPTICAL ROTARY ENCODER HAVING TWO HALF-PARTS OF A LATERAL SURFACE OF A ROTATING DISK

FIELD OF THE INVENTION

The present invention refers to a device (hereinafter called pulser) for Generating and transmitting pulse sequences.

More specifically, the device is intended to generate and transmit sequences of pulses which have to be subsequently processed. For example, pulses related to the fuel quantity which is supplied by a fuel pump of a service station.

BACKGROUND OF THE ART

At present, the already known pulsers used in fuel pumps have some drawbacks because they are equipped with electrically supplied components which have to be installed close to the measurement point (where the convertion from a flow quantity to a number is performed) of the fuel flow which is being supplied. This means that these pulsers need to overcome strict fire-proof tests before their approval and utilization.

Furthermore, as far as the tamper-proof capabilities of the known pulser are concerned, they can be easily infringed on the transmission to a processing unit of the pulses which have been generated.

For example, the known pulsers can easily be tampered with due to the electrical-type transmission of the pulses which are generated and transmitted to a processing unit external to the pulser.

In fact, it has been often found out that is possible to introduce into the electrical transmission some additional signals. These signals are very difficult to be distinguished from the "true" signal generated by the pulser without using encryption signal processing.

Further drawbacks are the small quantity and the poor quality of the signals which can be transmitted through the electrical lines.

AIM OF THE INVENTION

A first aim of the invention is to overcome the drawbacks of the already known pulsers.

A second aim is to make a pulser specifically suitable for applications which need fire-proof and safety approvals.

A third aim is to make a pulser suitable to applications which require high reliability on the generation and transmission of the true number of the pulses which have to be processed.

SUMMARY OF THE INVENTION

Said aims have been reached by an encoder and a pulser which are based on the generation and the transmission of pulses of the optical type.

In a first embodiment of the invention the pulses are generated by an encoder disk having reflecting surfaces which are illuminated by a remote light source. The light is guided on the surfaces by a proper guide, for example by optical fibers. The surfaces reflect the light towards a further optical guide, for example an optical fiber, which is connected to a unit which receives and processes the pulses and which comprises the electrically supplied components. This unit can be placed far from the encoder in a remote position.

A first advantage is given by the use of light pulses, specifically laser pulses, which are able to carry and transmit a larger number of data then the traditional electrical pulses, and to ensure a higher quality of the same data.

A second advantage is the possibility to use light sources, for example laser diodes, which have reduced dimensions and permit the manufacture of very small pulsers and encoders.

A third advantage is that in respect of the traditional electrical transmissions, a light pulses transmission performed through an optical guide is more difficult to be tampered with in order to add extra signals and modify the measure associated with the pulses, for example the measure of the flow of the fuel supplied at a service station. A fourth advantage is that the pulser and the encoder do not comprise electrically powered components which need to be installed in the fuel pump close to the supplying section. Thus, the pulser and the encoder of the invention are inherently fire-proof components which do not need specific approvals to be applied to fuel pumps or similar applications.

BRIEF DESCRIPTION OF DRAWINGS

Other advantages will be evident from the following description and the annexed non limitative drawings, in which:

FIG. 1 schematically shows a detail of a first embodiment of the pulser of the invention;

FIG. 2 schematically shows the light source of the pulser of FIG. 1;

FIGS. 3,3a, 3b schematically show three different embodiments of the encoder disk of the invention;

FIG. 4 shows the pulser of the invention comprising a device able to receive and process the pulses;

FIG. 5 shows a detail of a second embodiment of the pulser;

FIG. 6 schematically shows the light source of the pulser of FIG. 5;

FIG. 7 schematically shows a detail of a third embodiment of the pulser.

DETAILED DESCRIPTION OF THE INVENTION

Referring to the drawings, a preferred embodiment of the pulser of the invention is constituted by an encoder disk 1 in front of which the ends of three optical fibers f1–f3, inserted in a common cable 2, are placed. A laser diode 3 is placed at the opposite end of the central fiber f2, while a couple of phototransistors 4 are placed at the opposite ends of the lateral fibers f1, f3. A number N of reflecting surfaces 5 must be present on the edge of the disk 1. Surfaces 5 are preferably equally spaced from each other according to an angle d, while the lateral fibers f1,f3 are oriented with angles q1,2 from the central fiber f2, which is radially placed in respect of disk 1.

When operating, disk 1 rotates and surfaces 5 subsequently pass before the optical fibers f1–f3. The continuous light emitted by the diode 3 is transmitted through the central fiber f2 and illuminates the disk 1 edge. The surfaces 5 passing before the fiber f2 reflect the light, and each of them generates a pulse. The pulses generated by the reflecting surfaces hit the optical fibers f1, f3, which in turn guide the pulses up to the photo transistors 4.

In FIG.4 the laser diode and the phototransistor are part of a receiving unit 8 which also comprises a traditional Digital/Analogic converter 6 (hereinafter called D/A) which converts the signal received from the phototransistors into digital data, and a microprocessor-based device 7 which processes these digital data using suitable algorithms. These algorithms are conceived in order to determine the fuel flow which corresponds to the pulses emitted from disk 1, and also in order to extract various information from said digital data.

For example, when the light flow along all the receiving fibers is interrupted, the ends of these fibers are no longer illuminated ("dark" condition). The simultaneous "dark" condition of the receiving fibers can be utilized to find out whether they have been tampered with. Alternatively, said simultaneous "dark" condition can also be so used to determine in which sense disk 1 is rotating.

In a preferred embodiment, the disk has a diameter of 4–5 cm and presents one hundred or more reflecting surfaces equally spaced along the edge, which has a thickness of approx. 3 mm.

Angles q1,2 can vary between 15° and 20° so that at least one fiber f1 or f3 receives the light pulses which have been reflected from surfaces 5. Depending on the processing speed of the electronic components utilized, the peripherical speed of the disk and the width of surfaces 5 cause pulses of a suitable predetermined lenght. For example, pulses of 20 micro seconds and "dark" periods of 100 micro seconds can be obtained.

The pulses which have to be converted and digitally processed are squared pulses which can be transmitted with different phases through the receiving fibers f1,f3. Each squared pulse can also be modulated in order to carry security encoded data to be compared with the light emission of the light source. When the source is a laser diode, the pulses can be modulated with frequencies of Mb/sec and can carry a very larger quantity of data then the electric signals of the traditional pulsers (Kb/sec frequencies).

In a preferred application of the invention, disk 1 is driven by traditional devices which convert a fluid flow (e.g. in a fuel pump) into a corresponding number of revolutions of a shaft which is connected with the disk. The disk 1 revolutions, and therefore the fuel flow, correspond to a well determined number of pulses, which are caused by the surfaces 5 which pass in front of the illuminating fiber f2 and which reflect the light towards the receiving fibers f1,f3. The latter are connected to a receiving and processing unit 8 which can be placed far from the disk. The distance between disk and processing unit depends only on the ability of the fibers of properly transmit the signal up to the electronic unit of the service station which is intended to calculate and show to the user the charge corresponding to the fuel supplied.

The embodiment shown in FIG. 1 has a further advantage because it presents two channel (fibers f1,f3) through which the pulses are transmitted. This feature accomplishes with the ISO rules on pulses measurement systems, which require to make a phase and frequency comparison between the sequences of pulses which are transmitted on two separated channels.

The same possibility is given by a second embodiment, shown in FIGS. 5,6, in which two illuminating fibers f5,f6, coupled with two corresponding receiving fibers f4,f7, are provided. Fibers f5,f6 are illuminated by the same light source 3'.

FIG. 7 shows an embodiment of the invention in which only one fiber f8 which performs both the illuminating and the receiving function is provided. Fiber f8 is illuminated by a light source (for example a laser diode 3) and transmits the pulses reflected by the reflecting surfaces 5 of the disk 1. Between disk 1 and diode 3 a semitransparent surface 9 is provided, through which only the light which is directed towards the disk 1 can pass, while the pulses emitted by the surfaces 5 are reflected towards a receiving and processing microprocessor unit 8', similar to the already mentioned unit 8.

In this embodiment, a phase discrimination of the pulses can be operated during the signal processing, in order to have two separated receiving channel.

In FIG. 3a a second embodiment of an encoder disk 1' according to the invention is shown. Disk 1' is made up of two disks: a disk 1 of the already described type, which is superimposed and made integral to a second disk 11 whose lateral surface 5' is made reflective.

An equivalent disk 1' can also be obtained treating the lateral surface of a double-thick disk in order to obtain equally-spaced reflecting surfaces on the upper half-part and to make reflective all the lower half-part. In this embodiment, a further receiving fiber is optically coupled to the surface 5' by which it is continuously illuminated.

The ever-illuminated fiber is used to check whether tampering has occurred between the encoder disk and the processing unit. As mentioned above, such tampering would cause a "dark" condition at the end of the receiving fiber.

Therefore, in this embodiment the simultaneous "dark" condition of all the other receiving fibers is free to be used by the signal processing algorithm to determine in which sense the encoder disk is rotating given that the ever illuminated fibre in this embodiment carries out the function of monitoring whether the pulser has been tampered with.

In a further embodiment of the encoder disk of the invention the light pulses are obtained by superimposing a rotating disk having light transparent portions (for example the indented disk 1" of FIG. 3b) on a fixed reflecting surface 5". In this case, the illuminating and the receiving fiber/s will be fixed and placed orthogonally to the indented part 10 of the disk, and the pulses are caused by the passages of the indented portions of the rotating disk 1" between the fibers and the reflecting surface 5".

The pulser and the processing unit can also be resin-coated in order to increase their security. Once these components have been resin-coated, the only way to fraudulently modify the number of the pulses which have to be processed is to put additional data in the optical path between the disk and the processing unit. However, this operation is quite difficult, and this makes the pulser of the invention particularly suitable to tampering-proof applications.

I claim:

1. Optical rotary encoder, comprising a rotating disk on the lateral surface of which equally spaced light reflecting portions are provided, said reflecting portions being illuminated through at least one illuminating optical fiber by the light emitted by a distant light source, said reflecting portions causing the reflection of light pulses towards at least one receiving optical fiber, wherein said reflecting portions are provided on an upper half-part of said lateral surface of the rotating disk, while the whole lateral surface of a lower half-part of the same disk is a reflecting surface which is illuminated by said illuminating optical fiber and reflects a continuous light towards a further receiving optical fiber.

2. An optical rotary encoder according to claim 1, wherein said light source is a laser diode.

3. An optical rotary encoder according to claim 2, wherein said encoder comprises one radial illuminating optical fiber and two receiving optical fibers symmetrically placed in respect of said illuminating fiber and forming with the latter an equal angle in order to define two separated transmission channels of the light pulses reflected by said reflecting portions.

4. An optical rotary encoder according to claim 3, wherein said angle is between 15° and 20°.

5. An optical rotary encoder according to claim 1, wherein said at least one illuminating optical fiber and said at least one receiving optical fiber comprise one optical fiber passing through a semi-transparent surface able to reflect towards a processing microprocessor unit only the light pulses reflected by said reflecting portions.

6. An optical rotary encoder according to claim 1, wherein said disk is formed by a first half-disk on the lateral surface of which equally spaced light reflecting portions are provided and which is superimposed to a second half-disk the whole lateral surface of which is made light reflecting.

* * * * *